Patented May 14, 1940

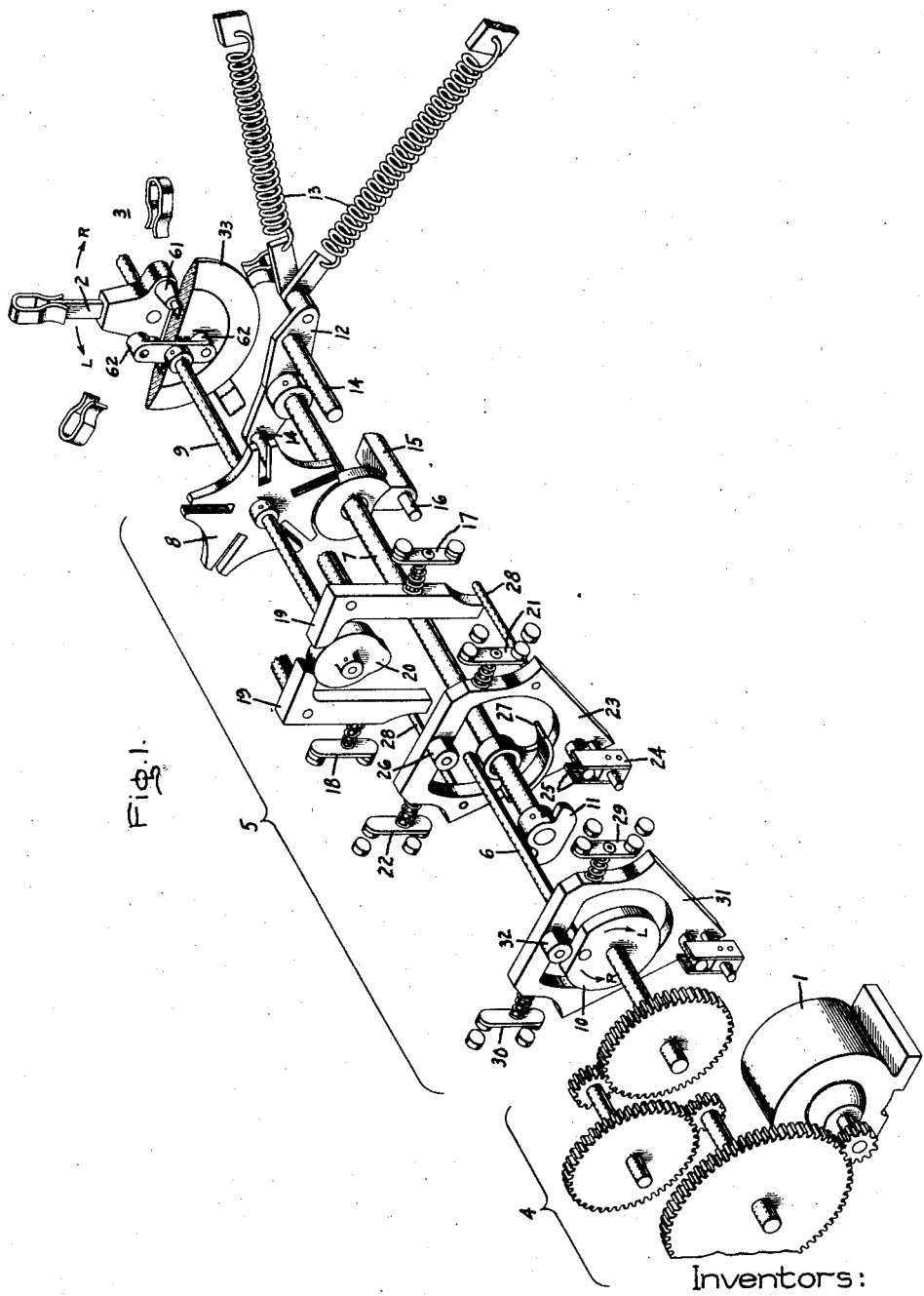
Inventors:
Thomas C. Lennox,
Salvatore Minneci,
by Harry E. Dunham
Their Attorney.

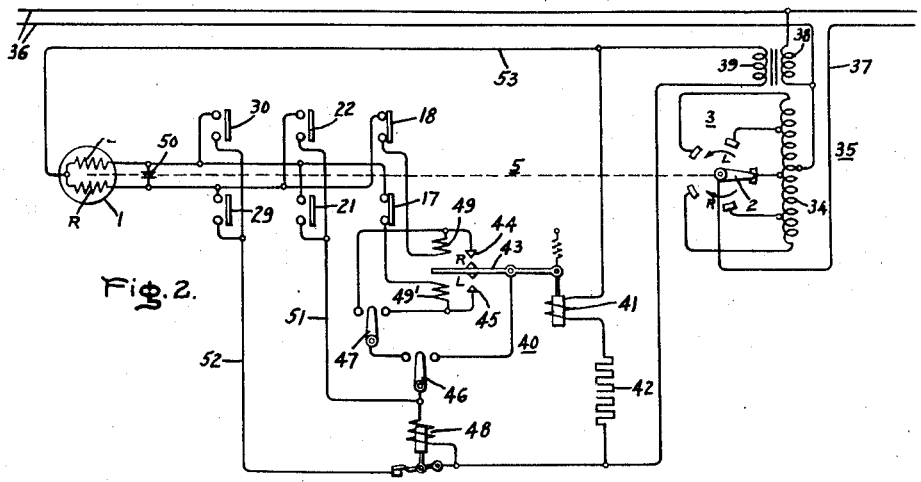
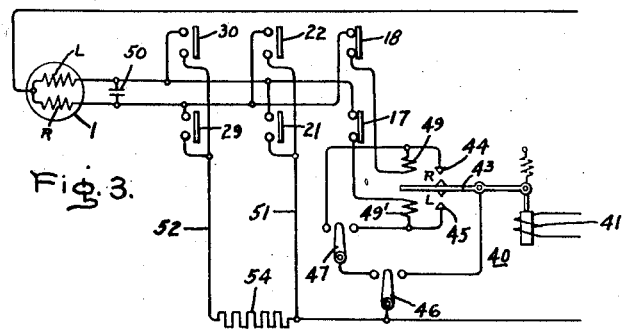
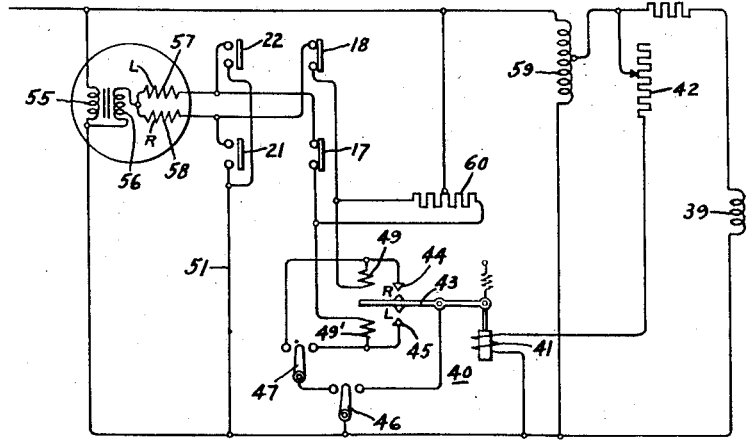
Inventors:
Thomas C. Lennox,
Salvatore Minneci,
by Harry E. Dunham
Their Attorney.

2,200,990

UNITED STATES PATENT OFFICE

2,200,990

ELECTRIC REGULATOR

Thomas C. Lennox and Salvatore Minneci, Pittsfield, Mass., assignors to General Electric Company, a corporation of New York Original application January 5, 1938, Serial No. 183,494. Divided and this application November 16, 1938, Serial No. 240,820

10 Claims. (Cl. 172—239)

This invention relates to electric regulators and more particularly to improvements in the control circuits of automatic motor operated step-type feeder-voltage regulators.

This is a division of our application, Serial No. 183,494, filed January 5, 1938, and assigned to the assignee of the present application.

Typical step regulators consist essentially of a transformer provided with tap-changing means for changing the transformer ratio under load. Primary voltage responsive means is included for controlling the direction of operation of reversible operating means for the tap-changing switch. In many such regulators the operating mechanism includes a spring drive whereby a relatively low-powered motor stresses the spring relatively slowly until a dead center point is passed, whereupon the spring rapidly snaps the switch through a tap-changing operation.

It is an object of the invention to provide means for positively returning the regulator operating motor and mechanism to a neutral or mid-position in the event that a tap change has begun but has not been completed, or after a tap change has been completed, so as to insure a uniform time delay for each new tap-changing operation.

An additional object of the invention is the provision of means for causing the operating motor positively to complete a tap change if the spring fails to complete a tap change.

Further objects of the invention will occur to those skilled in the art from the following description taken in connection with the accompanying drawings and the scope of the invention will be pointed out in the appended claims.

In the drawings, in which like reference characters designate the same elements throughout the several views, Fig. 1 is an expanded perspective view of a regulator operating mechanism for use with this invention, Fig. 2 is a diagram of a control circuit used with the mechanism of Fig. 1, and Figs. 3 and 4 are modified control circuits providing reduced power run back of the motor.

While the mechanism for operating the main tap changing switch of the regulator and the auxiliary control switches therefor form the subject matter of our above referred to present application, it is necessary to describe this mechanism here in order to provide a proper basis for the description of the control circuits and their operation.

Referring now to the drawings and more particularly to Fig. 1, there is shown therein an operating motor 1 for driving a movable contact 2 of a tap changing switch 3 through reduction gearing 4 and a spring drive 5. Both the motor 1 and the switch 3 are reversible. The main elements of the driving mechanism are a winding pin 6 for turning a crank shaft 7 which operates a Geneva-gear 8 fastened to the movable contact 2 by means of a secondary shaft 9. Because of the Geneva-gear the rotation of the winding pin in one direction will cause the rotation of the movable contact in the opposite direction and to facilitate the description it will be assumed that a clockwise rotation of the movable contact 2 and a counterclockwise rotation of the winding pin 6 will correspond to a voltage raising operation of the regulator, whereas, a counterclockwise rotation of the movable contact 2 and a clockwise rotation of the winding pin 6 will correspond to a voltage lowering operation of the regulator. These directions of operation are labeled adjacent the movable contact 2 and on a cam 10 which carries the winding pin 6.

As the motor 1 turns in either direction, the winding pin 6 will be turned with it and after the pin has made approximately a quarter of a revolution from the position illustrated in the drawings, it will engage a transverse member or segment 11 rigidly fastened to the crank shaft 7. On the opposite end of the crank shaft 7 is a crank 12 to which are fastened a pair of power springs 13 which normally hold the crank in the illustrated position. Carried by the crank on opposite sides of the shaft 7 are a air of driving lugs 14 which are arranged to engage a Geneva-gear driver 15 loosely mounted with respect to the crank shaft and carrying a driving pin 16 which engages the slots in the Geneva-gear. When the crank shaft has been rotated through half a revolution from the illustrated position, the springs 13 will be fully stressed and the mechanism will be on dead center. If now the crank shaft is rotated past dead center, the springs will rapidly return the crank and crank shaft to the illustrated position, thus, rotating these parts through the remaining half revolution to the position illustrated in the drawings and in so doing the Geneva-gear will be rapidly turned through a part revolution and the movable contact 2 will be rapidly snapped from the illustrated contact-making position to an adjacent contact-making position.

It will be noted that the connection between the winding pin 6 and the segment 11 permits the crank shaft 7 to turn ahead of the cam 10 and motor 1 so that these latter parts do not act to retard the tap-changing operation.

The mechanism is illustrated in its so-called neutral position and it typically requires approximately 25 seconds for a tap change to be completed after the parts start from this position.

By reason of the number of fixed contacts on the switch 3, the regulator is a 4-step regulator. Thus, as shown, there are two fixed contacts to the right of the center fixed contact corresponding to two steps of voltage raise and there are two fixed contacts to the left of the center contact corresponding to two steps of voltage lower.

A continued operation of the regulator beyond the maximum raise position or the maximum lower position would cause a sudden change from maximum raise to maximum lower in one step or from maximum lower to maximum raise in one step. This, of course, is very undesirable and to prevent it limit switches 17 and 18 are provided. The movable contacts of these switches are carried by pivoted members 19 which are engaged by a cam 20 operated by the shaft 9. The cam is so arranged that when the tap switch reaches its maximum raise position, the limit switch 18 is opened and when the tap switch reaches its maximum lower position, the limit switch 17 is opened.

In order to prevent the primary control device from stopping the operating motor when the dead center position is reached, a pair of seal-in or seal-through switches 21 and 22 are provided. The movable members of these switches are carried by a frame 23 pivotally carried by a support 24 and normally held in the illustrated vertical mid-position by spring members 25. Carried by frame 23 is a cam roller 26 which is engaged by a cam 27 mounted loosely with respect to the crank shaft 7 and arranged to be driven by the winding pin 6. Thus, as the winding pin 6 rotates in either direction from the illustrated mid-position, it will pick up the cam 27 and upon a predetermined further rotation the cam 27 will engage the roller 26 and will move the frame 23 about its pivot, thereby closing the switch 21 if the winding pin is turning in a lowering direction and closing the switch 22 if the winding pin is turning in the raising direction.

It is to be noted that because the cam 27 is loosely mounted it does not turn ahead rapidly with the crank shaft after the dead center position of the springs has been passed but, on the contrary, it stays against the winding pin 6 and thus holds the seal-in switch closed. As will be explained more clearly in connection with the control diagram of Fig. 2, this causes the motor to continue operation after the springs 13 have discharged their power and insures that if the springs have not completed the tap change, the motor will complete it.

The reason that it is undesirable to permit the primary control device to stop the motor near the dead center position is that a reversal of the motor may "unlatch" the mechanism and leave the tap changing switch in an "off" position.

In order to prevent stalling of the motor and mechanism if the primary control device should attempt to reverse the motor after a seal-in switch has closed, interlocks are provided between the seal-in switches and the opposite limit switches by means of pins 28 carried by frame 23 and engaging members 19. Thus, when seal-in 21 starts to close, the pins 28 move to the right or in a clockwise direction about the pivot 24 thereby causing limit switch 18 to open, while if seal-in switch 22 starts to close, the pins 28 move in the opposite direction thereby causing limit switch 17 to open. These interlocks are preferably so arranged that the limit switches open before the seal-in switches close so as to prevent the momentary occurrence of the overlapping condition in which both the seal-in switches and the limit switches are closed. If such an overlapping were permitted to occur and the primary relay should call for a reversal of the operating motor during this overlap, the motor would simultaneously be energized for operation in both directions and would stall.

In order to insure a positive return of the mechanism to its neutral position in case a tap change has begun but is not completed, or after a tap change has been completed, or if the primary relay should open between the time that a limit switch opens and the opposite seal-in switch closes, there are provided a pair of neutral return switches 29 and 30. The movable members of these switches are carried by a frame 31 which is similar to frame 23 and which is mounted in the same manner. A cam roller 32 carried by this frame is engaged by the cam 10, the arrangement being such that as soon as the cam 10 starts to turn in either direction, the frame 31 will be turned about its pivot and will close the switch 29 if rotation is in the lowering direction and will close switch 30 if rotation is in the raising direction and whichever switch has been closed will remain closed until the neutral position is again reached. By means of control circuits which will be described hereinafter in connection with Fig. 2, switch 29 controls a circuit for the motor 1 which tends to return the motor in a backward or raising direction to the neutral position, while switch 30 controls a circuit which tends to operate the motor in a backward or lowering direction. By reason of these switches the system has a uniform time delay in its operation because normally it will always start from the same point.

So as to insulate the operating mechanism from the high voltage power circuit, a disk of insulating material 33 is interposed between the movable contact 2 and the shaft 9. By means of a novel construction, this insulating member 33 also acts as a universal joint which will permit operation even though the shaft carrying the movable contact 2 and the Geneva-gear shaft 9 are not in alignment. As shown, the movable contact 2 carries a pair of projections 61, and the Geneva-gear shaft 9 carries a pair of projections 62 and these projections enter staggered openings in opposite faces of the disk 33. These openings do not pass all the way through the disk so that it is impossible to make an electrical connection through the disk itself. This construction results in the insulator having a substantial vertical creepage distance which is desirable in apparatus of this kind, as horizontal creepage distance is unreliable because dust, dirt, and other foreign material settling on a horizontal surface will impair its insulating ability, but no such material will remain on the vertical creepage surfaces of the insulator 33. The insulator is preferably made of porcelain. In order to secure long life and reduce the cutting action of the porcelain to a minimum, the inner surfaces of the openings into which the projections 61 and 62 fit, are glazed and fiber bushings are interposed between the projections and the walls of the openings.

While the parts of Fig. 1 have been separated in a lengthwise direction so as to facilitate their illustration, it should be understood that in practice these parts can be and are very compactly arranged so that actually they do not take up any more lengthwise space than does the motor 1 itself.

In Fig. 2, the fixed contacts of the switch 3 are connected to taps in a series winding 34 and a regulating transformer 35. As shown, the electrical mid-point of this winding is connected both to the center fixed contact of the switch 3 and to one side of a single phase alternating current power line or feeder circuit 36. The movable contact 2 is connected to the same side of the line 36 by means of a conductor 37 so that with the movable contact 2 on the center fixed contact, as shown, none of the series winding is connected in the power circuit and the regulator is in its neutral position corresponding to the position of the movable contact 2 in Fig. 1. If now movable contact 2 is moved in either direction, varying amounts of the series winding are connected in the power circuit for either boosting the circuit voltage or bucking the circuit voltage. Transformer 35 is also provided with a shunt or primary winding 38 and an auxiliary winding 39 for supplying low voltage current to motor 1 and for producing a voltage which is proportional to the voltage of the feeder circuit 36. Connected to respond to this voltage is a primary relay in the form of a contact-making voltmeter 40 having an operating winding 41 connected in series with a resistor 42. Contact-making voltmeter 40 is provided with a movable contact 43 for cooperation respectively with a raise contact 44 and a lower contact 45. A control switch 46 is provided for securing selective automatic and manual operation. The manual operation is controlled by means of a manually operated raise and lower switch 47.

When control switch 46 is moved to the right it connects the movable contact 43 of the contact making voltmeter to one side of the auxiliary winding 39 through the operating winding of an auxiliary relay 48 which cooperates with the neutral return contacts 29 and 30, while when it is moved to the left it makes a similar connection between the manually-operated raise and lower switch and the same side of the auxiliary winding 39. The raise and lower contacts of the manually-operated switch 27 connect respectively to the raise and lower contacts of the contact-making voltmeter. The raise and lower contacts are connected respectively to the limit switches 18 and 17 through conventional holding coils 49 and 49' on the contact-making voltmeter. These holding coils are provided for preventing chattering of the voltmeter contacts. The motor 1 is provided with a phase-splitting capacitor 50 in a conventional and well-known manner.

The seal-in switches 21 and 22 are connected respectively to the terminals of the motor for causing it to operate in a lowering and raising direction and they are connected by means of a common conductor 51 to the lowermost side of the auxiliary winding 39 through the operating winding of the auxiliary relay 48.

The neutral return switches 29 and 30 are connected respectively to the motor terminals for causing operation in the raising and lowering directions and they are supplied by a common conductor 52 through the contacts of the auxiliary relay 48. A common return conductor 53 connects the common terminal of the motor to the upper side of the auxiliary winding 39.

The operation is as follows: With the parts in the positions shown, the regulator is in its neutral position and the voltage of the circuit 36 is normal causing the contact-making voltmeter 40 to be in its mid-position. If automatic operation of the regulator is desired, the control switch 46 is moved to the right into its automatic operation position. If now the voltage of circuit 36 should decrease, the contact-making voltmeter would close its raise contacts, thereby completing a circuit for the motor through the holding coil 49 and the raise limit switch 18. This will start the motor in a raising direction. The motor current in flowing through the operating winding of the auxiliary relay 48 will cause this relay to open its contacts. Very soon after the motor starts the neutral return switch 30 will close, but as the contacts of the auxiliary relay 48 are opened no circuit is completed by the closure of the neutral return switch. Continued operation of the motor will cause the power springs 13 (Fig. 1) to be stretched until, shortly before the dead center position is reached, the lower limit switch 17 will open and almost immediately thereafter the seal-in switch 22 will close. Opening of the lower limit switch 17 and closing of the seal-in switch 22 removes control of the operating motor from the contact-making voltmeter. The motor, therefore, will continue to operate in a raise direction regardless of what the contact-making voltmeter does and as soon as dead center is passed, the springs 13 will snap the movable contact 2 in a clockwise direction to the next adjacent fixed contact, thereby inserting in the circuit 36 a portion of the series winding 35 and raising the circuit voltage one step.

If this brings the voltage within the normal voltage range, the contact-making voltmeter will go to its non-contact-making position and will not call for any further regulation. However, as previously explained in connection with Fig. 1, the seal-in switch 22 remains closed until the motor 1 has been run long enough to return all of the parts of the driving mechanism to their neutral positions as shown in Fig. 1, whereupon the seal-in switch 22 opens and the motor is deenergized.

If the fall in voltage has been only momentary and the contact-making voltmeter opens its raise contacts before the seal-in switch 22 closes, the auxiliary relay 48 will be deenergized, thus closing its contacts and completing a circuit through the neutral return switch 30. This circuit reverses the motor and causes it to turn in the lowering direction until the operating mechanism is returned to its neutral position. The springs 13, of course, tend automatically to return the mechanism toward the neutral position at such times but because of friction, the retarding action of thickened oil during cold weather and the large mechanical advantage of the reduction gearing 4, the springs cannot be relied upon to provide the return movement. In any event, they would never return the part of the mechanism including the motor and driving pin exactly to its neutral position and thus could not provide inherently the equal time delay feature provided by the present invention through the action of the neutral return switches in causing positive neutral return by reverse energization of the motor.

If the voltage should rise high enough to cause the contact-making voltmeter to close its lower contacts 45 before the lower limit switch 17 opens, the motor will be reversed through the lower contacts 45, the holding coil 49' and the lower limit switch 17 and if the high voltage condition persists the motor will continue on through the neutral position to cause a lowering operation of the regulator in a manner corresponding to the above-described raising operation. During this lowering operation, the lower seal-in switch 21 and the neutral return switch 29 and the raise limit switch 18 will operate to provide the same protection of the mechanism as has just been described for a raising operation. That is to say, the neutral return switch 29 will close as soon as the neutral position has been passed in the lowering direction and just before dead center is reached the raise limit switch 18 will open and immediately thereafter the lower seal-in switch 21 will close.

For manual operation, the control switch 46 is moved to the left and then raising and lowering operations can be selectively secured by moving the manual switch 47 to the left or to the right respectively, the resulting operation being just the same as though control were by means of the contact-making voltmeter.

In Fig. 3, the circuit has been simplified by substituting a resistor 54 for the auxiliary relay 48. Resistor 54 is connected between the conductors 51 and 52 and permits the neutral return switches 29 and 30 to run the motor back to neutral at reduced power, whereas the circuit of Fig. 3 provides run back at full power. During regulator operation energization of the motor for producing a regulator operation is secured through the contact-making voltmeter contacts, the limit switches and the seal-in-switches, while at the same time reverse energization at reduced power is applied to the motor through the resistor 54 and the neutral return switches. The motor, therefore, also proceeds in a regulating direction at reduced power.

In the modification shown in Fig. 4, the motor is of the type covered in Morrill Patent No. 1,913,208. It is provided with a main winding 55 to which is inductively coupled a low voltage winding 56 for energizing low voltage shading coils 57 and 58 for causing operation of the motor in lowering and raising directions respectively. The main winding 55 of the motor is connected across the output winding of an autotransformer 59 for stepping up the voltage of the auxiliary winding 39 so as to insure adequate operating voltage for the motor at all times.

A run back controlling resistor 60 is connected to the direction controlling circuits of the motor between the limit switches and the holding coils and a connection from the mid-point of the resistor 60 is made to the high voltage side of the autotransformer 59.

The operation of Fig. 4 is generally the same as the operation of the previous figures except for the run back feature for protecting against loss of control in case the primary relay reverses after the reverse direction limiting limit switch has opened and before the proper seal-in switch has closed. For example, suppose that after the raise contacts 44 of the contact-making voltmeter have closed for a time long enough to cause the motor to open the lower limit switch 17 and that before the seal-in switch 21 has closed the contact-making voltmeter reverses and closes its lower contacts 45. Under these circumstances the raise winding 58 of the motor will be reversely energized through the limit switch 18 and the left-hand half of the reversing resistor 60. The reason that the current in the raise winding 58 will be reversed is because the voltage across the high voltage winding of the autotransformer 59 is higher than the opposing voltage across the low voltage winding 56. This, therefore, reverses the motor and causes it to turn in a lowering direction until the lower limit switch 17 closes again, whereupon, the motor will be energized in the normal manner through the lower contacts of the contact-making voltmeter and the lower limit switch 17. Also, as soon as the lower switch 17 closes, both motor windings 57 and 58 will be energized with the same amount of reversed current through the two halves respectively of the resistor 60 so that under these conditions the reversing resistor 60 does not tend to cause operation of the motor. Similarly, when limit switch 18 opens during a lowering operation, if, before the seal-in switch 22 can close, the contact-making voltmeter opens or reverses its contacts, the energization of the motor through the resistor 60 will cause it to run back to the point where positive reverse control will be secured by the closing of the limit switch 18.

While there have been shown and described particular embodiments of this invention, it will be obvious to those skilled in the art that changes and modifications can be made therein without departing from the invention and, therefore, it is aimed in the appended claims to cover all such changes and modifications as fall within the true spirit and scope of the invention.

What we claim as new and desire to secure by Letters Patent in the United States is:

1. In a regulator, an operating motor, a primary device for controlling the direction of operation of said motor in accordance with the value of a quantity to be regulated, seal-in means for causing said motor to operate a predetermined amount after said primary relay causes said motor to start, and means operated substantially coincidentally with the operation of said seal-in means for preventing said primary device from stalling said motor by attempting to cause its reversal after said seal-in means has been operated.

2. In an automatic regulator, a reversible operating motor, a primary device for controlling the direction of operation of said motor in accordance with the value of a quantity to be regulated, limit switches for preventing said motor from causing regulator operation beyond predetermined limiting positions, seal-in switches for normally causing said motor to operate a predetermined amount after said primary device starts said motor, and an interlock for opening the opposite direction limiting limit switch whenever a seal-in switch closes in order to prevent said primary device from stalling said motor by attempting to reverse it after a seal-in switch closes.

3. In a regulator, reversible regulator driving mechanism, a primary device for controlling the direction of operation of said driving mechanism, means operative after said driving mechanism starts for normally insuring a predetermined amount of regulator operation in the direction in which said driving mechanism started, a second means operative substantially but not exactly simultaneously with the operation of the first means for preventing said primary device from reversing said driving mechanism during the operation of the first means, and apparatus operative for reversing said driving mechanism if said primary device acts to change its control of said driving mechanism during the interval between the operation of the two said means.

4. A regulator having, in combination, a reversible operating motor, a primary device for controlling the direction of operation of said motor in accordance with the value of a quantity to be regulated, delayed operating seal-in means operated by said motor for causing a predetermined amount of motor operation in the direction in which the primary relay starts said motor, additional means operated by said motor prior to the operation of said seal-in means for preventing said primary relay from energizing said motor for reverse operation when said seal-in means is operated, and separate means for reversing said motor if said primary relay stops operation of said motor before operation of said seal-in means.

5. A regulator having, in combination, a reversible operating motor, a primary device for controlling the direction of operation of said motor in accordance with the value of a quantity to be regulated, delayed operating seal-in means operated by said motor for causing a predetermined amount of motor operation in the direction in which the primary relay starts said motor, additional means operated by said motor prior to the operation of said seal-in means for preventing said primary relay from energizing said motor for reverse operation when said seal-in means is operated, and separate means for reversing said motor if said primary relay stops operation of said motor before operation of said seal-in means and after operation of said additional means.

6. In a step type voltage regulator, in combination, a reversible operating motor, a primary device for controlling the direction of operation of said motor in accordance with the value of a quantity to be regulated, delayed operating seal-in means operated by said motor for normally causing a predetermined amount of motor operation in the direction in which the primary relay starts said motor, additional means operated by said motor prior to the operation of said seal-in means for preventing said primary relay from energizing said motor for reverse operation when said seal-in means is operated, neutral return switches operated by said motor, an auxiliary relay, regulator driving mechanism operated by said motor and having a neutral position, and control circuits controlled by said neutral return switches and said auxiliary relay for reversing said motor and returning said driving mechanism to its neutral position if said primary relay stops operation of said motor before operation of said seal-in means.

7. In a step type voltage regulator, in combination, a reversible operating motor, a primary device for controlling the direction of operation of said motor in accordance with the value of a quantity to be regulated, delayed operating seal-in means operated by said motor for causing a predetermined amount of motor operation in the direction in which the primary relay starts said motor, additional means operated by said motor prior to the operation of said seal-in means for preventing said primary relay from energizing said motor for reverse operation when said seal-in means is operated, neutral return switches operated by said motor, a resistor, regulator driving mechanism operated by said motor and having a neutral position, and control circuits completed through said resistor and said neutral return switches for reversing said motor and returning said mechanism to its neutral position if said primary relay stops operation of said motor before operation of said seal-in means.

8. A regulator having, in combination, a reversible operating motor, a primary device for controlling the direction of operation of said motor in accordance with the value of a quantity to be regulated, delayed operating seal-in means operated by said motor for causing a predetermined amount of motor operation in the direction in which the primary relay starts said motor, additional means operated by said motor prior to the operation of said seal-in means for preventing said primary relay from energizing said motor for reverse operation when said seal-in means is operated, and means including a resistor for reversing said motor if said primary relay stops operation of said motor after operation of said additional means and before operation of said seal-in means.

9. In a regulator, a reversible motor, a primary device for controlling the direction of operation of said motor in accordance with the value of a quantity to be regulated, a mechanical driving connection to said motor, said connection being so arranged as to provide a time delay interval between the starting of said motor and a regulating action, said motor having a neutral position from which the time interval between starting and completion of a regulating operation is the same for both directions of motor operation, and means including neutral return switches for electrically running said motor back to said neutral position if said primary device stops energization of said motor during said time delay interval.

10. In a regulator of the type which operates in steps, an operating motor, a spring drive connected to said motor, said drive including a connection whereby when said motor stresses the spring to a certain point the spring normally causes a snap action regulating step which occurs faster than the motor can normally complete such a step, and seal-in means for causing the motor to continue operation long enough positively to complete a regulating step in case such step is not first fully completed by the spring.

THOMAS C. LENNOX.
SALVATORE MINNECI.